United States Patent Office 2,729,141
Patented Jan. 3, 1956

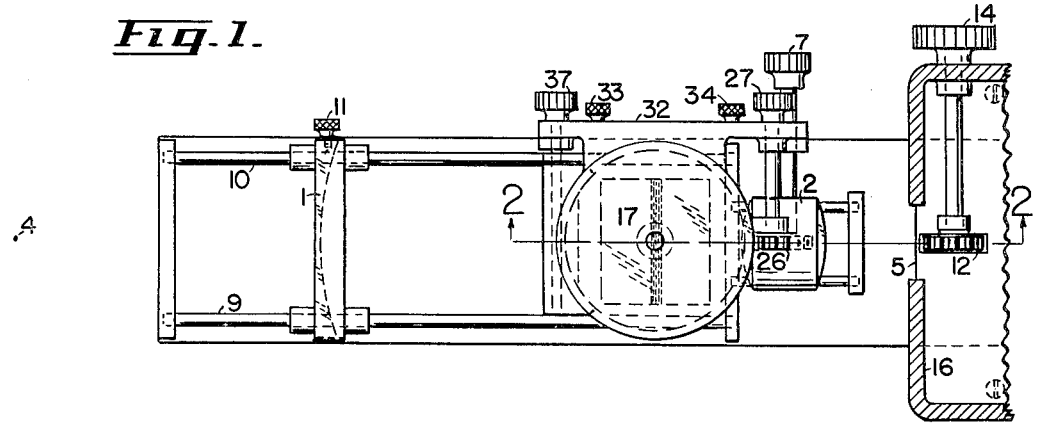

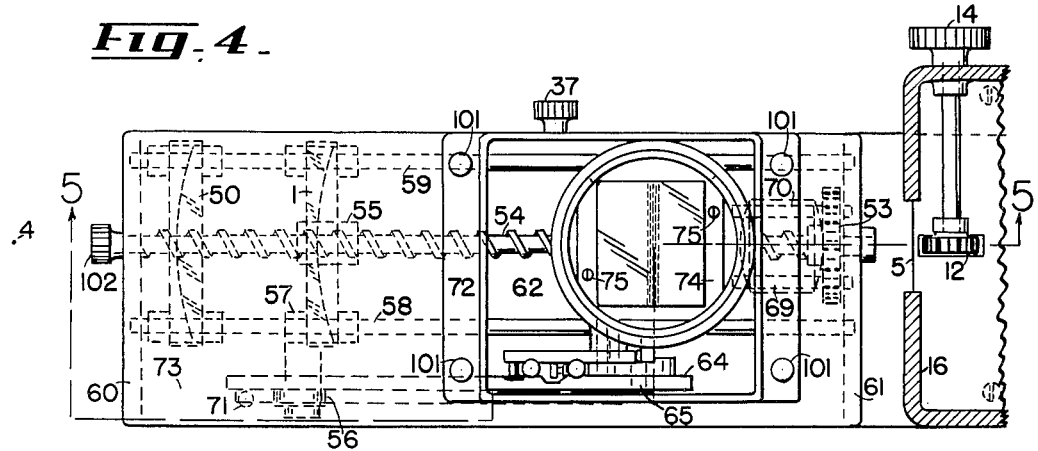

2,729,141
IMAGE SUPERIMPOSITION PROJECTION DEVICES

Joseph B. Walker, Los Angeles, Calif.

Application May 11, 1953, Serial No. 353,968

9 Claims. (Cl. 88—24)

This invention relates to means for optically superimposing images in those arts in which artistic backgrounds for living performers or superimposed advertising or explanatory matter upon a scene are desired. In broad aspect, my device enables any two scenes to be combined, the illumination at any point in the combined scene being the sum of the illuminations of the individual scenes.

In accomplishing these ends, the prior art has been content with bulky devices comprising a plurality of mirrors. Because of this inconvenience, optical combination of images has not been practiced to the extent to which the process can be gainfully and artistically applied. In the practical arts of television, motion pictures and slide or commercial picture production a process will not be used unless the apparatus for accomplishing it is relatively compact and easily attached or removed from the basic camera unit with which it must be associated.

In the prior art it will be understood that if the optical system of a camera is focused at twenty feet upon living performers, the artificial background or advertising insert must also be located at approximately twenty feet in order that the auxiliary material be in focus. This requires bulky mirrors and near life-size properties to accomplish the process.

In the television, motion picture and kindred arts it has become standard practice to frequently vary the magnification of the optical system of the camera, thereby to "zoom" either toward or away from the object of principal interest without moving the camera. Because of this practice and the usual one of moving the camera the practical difficulties of retaining focus, congruent fields of view, equal magnification and free mobility of the camera prior to forming the composite image with the bulky mirror method will be understood.

At other times, effects in which the superimposed scene becomes fuzzy are desired, yet the prior art has provided no practical way in which this can be conveniently accomplished. Such situations are those in which the principal character may be entering a faint or a dream and this is to be portrayed by visual impression as well as by dialogue or action. This effect is easily obtained by adjustment of my device.

The principal object of my invention is to provide a relatively compact optical image superimposition device.

Another object hereof is to provide an optical superimposition device which can be attached or removed at will from a camera.

Another object of my invention is to provide a superimposition device capable of variable magnification in optical synchronism with the variation of magnification of the main scene in which the superimposed scene remains in focus.

Still another object is to provide a superimposition device in which the superimposed scene passes out of focus by a determinable amount when the optical magnification of the optical system is changed, and by means that can be adjusted as to the amount.

Still another object of my invention is to provide means to superimpose other scenes upon motion picture film images.

Another object of my invention is to superimpose images of differing kinds of radiation.

Other objects of my invention will be apparent to one skilled in the art upon reading the following detailed specification and examining the related drawings, in which:

Fig. 1 shows the essential aspects of my invention, in plan,

Fig. 2 shows the same in elevation,

Fig. 3 shows an alternate arrangement of part of the invention,

Fig. 4 shows an automatic embodiment of my invention, in plan,

Fig. 5 shows the same in elevation, and

Fig. 6 shows an arrangement for superimposing images of opaque objects.

In Figs. 1 and 2, numeral 1 represents the primary lens, divergent, of my optical system. This coacts with secondary lens 2, convergent, to form an image 3 of object 4 that is located in the usual field of view. Image 3 is normally formed upon transducing surface image plane 5, shown obliquely for clarity, such as a light-sensitive motion picture film, the electron-responsive surface of a television camera tube, the sensitized plate in a still camera or the equivalent variants of similar devices.

It is not necessary to describe these known devices in detail; the motion picture film is moved and stored by means known as a motion picture camera; the sensitive surface of the camera tube is inclosed in a transparent, evacuated envelope and is provided with electron deflection means, actuating voltages, amplifiers and other elements comprising a television camera; the plate or film of the still camera is inclosed in a light-tight box provided with a shutter, iris and so on.

Surface 5 may also be a translucent screen for viewing image 3 or may even be omitted in instances where the image is to be further optically manipulated.

The above-identified lenses comprise the essentials of my "Electrazoom" lens, described in U. S. Patents 2,506,947; 2,515,104; 2,547,187 and 2,532,685.

Lenses 1 and 2 are suitably mounted and slide along rods 9 and 10 for adjustment in relative position. In the simple embodiment shown in Figs. 1 and 2 the axial distance between the lenses is manually varied to provide different magnifications and the common distance is varied from plane 5 in order to focus object 4 when at various distances from the system to a sharp image 3 on plane 5. Pinion 6, actuated by knob 7 and meshed with rack 8, shown, is for the purpose of conveniently varying the position of lens 2. Lens 1 is merely slid along rods 9, 10 and locked in position by setscrew 11. The common distance is varied by means of pinion 12, rack 13 and knob 14 effecting movement of base 15 with respect to camera housing 16.

Referring now to Fig. 2, slide 17 is a transparency, the image 18 of which it is desired to superimpose on image 3 upon plane 5. Numeral 19 represents a source of radiant energy, say light, and reflector 20 a means for conveniently and efficiently directing this to transparency 17. Corrected converging lens combination 21, 22 brings image 18 to a focus over a shorter optical path than were the lens absent. Element 23 is a half-silvered mirror or the like, preferably constituted to pass nine-tenths of the light from object 4 and to reflect only one-tenth of the light passing through transparency 17. This is the preferred ratio because it is relatively easy to provide illumination in the superimposition optical system 19, 20, 17, 21, 22, in comparison to illuminating the field of view containing the object of principal interest 4 when that object is a performer or a group of performers on an interior stage.

Mirror 23 can be easily prepared by vacuum evaporation, vacuum sputtering or by the Rochelle (silver) salt process. It is only necessary to interrupt any of these processes considerably prior to the period of time required for forming the usual fully-reflecting mirror. Aluminum may be deposited by vacuum evaporation, as may silver, nickel, chromium and platinum. The degree of reflectability may be measured by known methods, including that of holding an exposure meter successively beneath mirror 23 and in front of lens 2 of Fig. 2 and noting the ratio of the two readings with light source 19 operating and other illumination absent. The first reading should be about ten times larger than the second. The mirror may be coated with a thin coat of transparent optical lacquer to prevent tarnishing of the first surface, if this is a factor.

On each of elements 17 and 21, 22 I provide adjusting means. Transparency 17 is placed upon slidable carrier 24, provided with rack 25 with which pinion 26 meshes and which may be revolved manually by knob 27. Similarly, lens elements 21, 22 are mounted in slidable carrier 28, provided with rack 29 with which pinion 30 meshes and which may be revolved manually by a knob directly below knob 27 in Fig. 1. The above carriers slide in hollow cylindrical member 31. These means are for the purpose of focusing image 18 on plane 5 to any degree of sharpness desired and also to allow positioning of that image as may be required by the particular scenes involved. Conveniently, the elements of the superimposition optical system are adjustably attached to frame 32, which in turn is adjustably and removably attached to main base 15 by thumbscrews 33 and 34.

In operating my device, lenses 1 and 2 are positioned apart a distance suited to the desired magnification of the principal object 4. The closer these lenses are positioned, the greater the magnification. Focus of the object 4 as image 3 on plane 5 is accomplished by adjusting the position of both lenses with respect thereto; i. e., by moving base 15 relative to housing 16, with knob 14, provided. In the superimposition optical system a transparency 17 desired, say a slide of a medieval castle, is placed in position. By means of the adjustments, elements 17 and 21, 22 are caused to image the castle scene as image 18 upon plane 5. Rheostat 35 is adjusted to control the output of source 19 such that the brightness of the two images 3 and 18 are the same or are in any ratio desired. Battery 36 illustrates the source of electric power for energizing lamp 19. The relative positions of the images can be altered by moving transparency 17 to any desired coplanar position to that shown and also by changing the angle, in either or both dimensions, of mirror 23. Knob 37 is provided for convenient adjustment of the mirror.

The illumination at any point on plane 5 is the sum of the brightness of images 3 and 18. As a practical matter it is desirable to choose background scenes that are relatively dark in the area where the performers shall move. For superimposing an item or printing upon a scene the opposite conditions of brightness apply; i. e., a bright item on transparency 17 lying over a dark area of the main scene. Also, the phenomenon of saturation of the sensitive surface 5 may be invoked. In other words, levels of illumination in excess of certain amounts will not cause an increased response in photographic films or electron-responsive surfaces, thus the white of a superimposed printing can be made uniform.

It is to be noted that lens 2 is a converging or positive lens, whereas lens 1 is diverging or negative. Consequently, the conjugate focus of lens 2 is not far removed from lens 1, but of the pair is considerably removed; for example, at twenty feet. Because of this the optical path from transparency 17 to image 18 is relatively short, and the more so because of converging lens 21, 22. In this way I accomplish one of the principal objects of my invention.

Certain modifications may be made in my device without departing from the teaching of this invention. For one, the lens 21, 22 may be eliminated, in which case the distance between transparency 17 and mirror 23 must be increased a fraction of the initial distance. Also, light source 19 and reflector 20 may be positioned to illuminate the lower side of element 17, which then may be an opaque picture or object, as a photograph or the face and hands of a clock, as will be further described later. Any reflectance ratio may be utilized for mirror 23 and any color of light or ultra-violet or infra-red energy emitted by source 19, the lenses 21, 22 and 2 then being of suitable material for such radiation, such as quartz.

Fig. 3 shows a modification of the superimposition optical system for use with the usual motion picture projector. Light source 19 and reflector 20 are removed from the device and mirror 40 substituted, being held by thumbscrews 41 threaded into frame 32.

It is convenient to position the motion picture projector to the side of my device, since it then does not interfere with the field of view nor is the optical path obstructed by the camera housing 16. Fig. 3 is thus a partial front elevation, looking from the field of view toward the camera. In order that the top to bottom and side to side of the superimposed scene correspond to that of the field of view it is necessary that the motion picture projector be laid on its side or that a prism capable of revolving the projector image by a right angle be used. A right-angle prism 42, inclined at an angle of forty-five degrees from the vertical will accomplish this if placed in the optical path 43 from the projector. This prism may be attached to the projector (not shown) or positioned elsewhere in the optical path as shown. If the prism is revolved the superimposed image may be laid on its side or otherwise oriented with respect to the image of the field of view for special effects.

The light from the motion picture projector is reflected into the superimposition optical system by mirror 40 and impinges upon a translucant screen 44, which is placed in the slide holder 24 instead of the slide that would be there in usual operation. Screen 44 may be of opal or frosted glass or an equivalent substance adapted to transmit a fine-grain image. This image is then functionally the same as an illuminated slide and so the remainder of the superimposition process is the same as has been previously explained.

Having described above how I achieve certain of the objects of my invention, how variable magnification of the superimposed scene is automatically accomplished in accordance with variable magnification of the main scene will now be described. This embodiment is shown in Figs. 4 and 5. It is to be understood that the essentials of this device are the same as those of the device shown in Figs. 1 and 2.

In Figs. 4 and 5, concave lens 1 and convex lens 2 form the main optical system, as before. Convex lens 50 is an additional lens employed to reduce the overall effective focal length of the main optical system. This is often convenient in the practical application of my device, but the embodiments shown in either Fig. 2 or Fig. 5 may include either two or three lens elements as may be desired and the focal lengths of these elements may vary over a wide range without departing from the teaching of my invention. In the present instance, lenses 50, 1 and 2 form an image 3 of object 4 upon a translucent surface image plane 5, lenses 1 and 2 being automatically moved the requisite amounts by the cam means shown that was originally described in my previously mentioned patents.

Briefly recounting this structure, reversible motor 51 is energized by the operator at will to vary the magnification of the device. Through gears 52 and 53 worm 54 is caused to revolve. Internally threaded member 55 engages the worm and causes translatory motion of lens 1 and follower 56; these being attached to sleeve 57, one of a pair that slide upon rods 58 and 59 which are spaced apart and fastened to uprights 60 and 61 of base 62. When motor 51 is actuated in one direction or the other, cam 63 coacting with follower 56 causes an up or a down motion of cam plate 64 by virtue of pivot 65. A necessary compensatory motion is thus imparted to lens 2, keeping image 3 in focus at any magnification, by gear teeth 66 formed in plate 64, these being in mesh with rack 67. Holder 68 for lens 2 translates on rods 69 and 70, accomplishing coaxial movement of lenses 1 and 2 either toward or away from each other. Coaxial movement is usual in devices of this class but is not mandatory in my device if change in position of image 3 upon plane 5 is sought in addition to change in magnification. Spring 71 insures that the cam and follower will remain in intimate contact. Base 62 is fastened to the camera housing 16 containing the working focal surface 5 by any suitable means, preferably allowing convenient axial adjustment as has been previously described in connection with Fig. 2.

Turning now to the superimposition aspects of my device, structure 72 is detachably mounted to the outer case 73 of the main optical system. Case 73 is rigidly constructed and rigidly mounted upon base 62.

Light source 19 in reflector 20 suitably illuminates transparency 17, an image 18 thereof being formed on plane 5 through the coaction of lens 2 and mirror 23 and with or without lens 21 as has been previously described. Lens 22 has been omitted in this embodiment, this being a color correcting element and not required in all instances.

Transparency 17 is here retained by carrier 24 having guide 74 or equivalent means allowing rapid replacement of one transparency with another as is desirable in practical operation. The guide is movable as a whole with respect to the carrier under spring tension screws 75 so that the position of the slide may be changed by the operator and thereby the position of image 18 of the slide with respect to the main image 3 on plane 5.

When the magnification of the main optical system is increased and image 3 becomes more of a "closeup", the distance of the transparency 17 from the image 18 thereof must be decreased in the usual case where it is desired that the relative sizes of images 3 and 18 remain the same. To accomplish this I provide link 76 connecting between cam plate 64 and a bell-crank 77. On the side of the crank opposite the link, gear teeth 78 lie on the arc of a circle having the same center as the fulcrum pin 79 and engage corresponding teeth on a rack 80 attached to slide holder 24. This kinematic chain effects a reversal in the direction of motion of transparency 17 with respect to the motion of plate 64. Thus, when the latter is in an upraised position with the lens combination 1 and 2 giving maximum magnification the transparency is in a depressed position, causing the image 18 to be correspondingly enlarged. In order that this image remain in focus during the change of magnification a clamping strip 81 and clamping screw 82 are provided to allow a shift in the position of pin 83 that connects link 76 to crank 77. With screw 82 loosened, pin 83 may be adjusted to give a greater relative movement of transparency 17 when the pin is located to the right, or vice versa. For special effects, adjustment of this pin either side of the norm will cause the transparency to pass out of focus with departure from a given magnification of the system. By similar adjusting means 84 and 85 pin 86 may be adjusted in position to alter the effective length of link 76 and thus allow proper focus adjustment or cause the in-focus and out-of-focus special effects to occur at any desired magnification.

Converging lens 21 is fastened in holder 87, which is free to translate in the enclosing cylinder 88. Lens holder 87 is provided with rack 89, engaging teeth 90 of bell-crank 91. At pin 92 this is connected to link 93, which is connected, in turn, to plate 64 as before. In my practical embodiment I found that lens 21 should move in the same direction as transparency 17 when the magnification of the superimposition system is changed. Thus, the bell-cranks 77 and 91 are levers of the same kind, having fulcrums between the points of application and take-off of the motions. Elements 92, 94, 95 and 96, 97, 98 of the short link adjustably fasten it to plate 64 and bell-crank 91 in the same manner as was described in connection with link 76. Consequently, maintenance-of-focus adjustment of image 18 and special effects to out-of-focus may also be obtained by these adjustments.

Mirror 23 is both transmissive and reflective as before, being pivotably supported at 99 and steadied by spring holding supports 100 pressing on each side of the mirror.

Recapitulating, by means of the adjustments described and the resulting motions of transparency 17 and lens 21 in relation to the motions of lenses 1 and 2, the variation of magnification of both images 3 and 18 may be made the same or different and may be made to remain in focus or to pass out of focus at given magnifications by given amounts.

The structure 72, supporting the essentials of my superimposition device, may be removed from the lens adjusting mechanism contained within base 62 and enclosure 73 by removing fastenings 101 and disconnecting links 76 and 93. The same optical effect can be obtained by rotating mirror 23 upward so as to remove it from the optical path of lenses 1 and 2, knob 37 allowing this to be accomplished by external means. The superimposed image 18 can also be removed from plane 5 by extinguishing the source of illumination 19, the mirror remaining in place. In this instance the ten percent light loss continues to be incurred in the main optical system, lenses 1 and 2.

In these ways I accomplish several objects of my invention.

It will be understood that the teachings of my Patents 2,506,947; 2,515,104; 2,547,187 and 2,532,685 may be applied to the main optical system of the present invention.

Alternate means for providing the picture of transparency 17, such as a motion picture film, may be used. In addition to the arrangement for the conventional projector shown in Fig. 3, the film may be exhibited by means of the usual intermittent motion, or by continuous motion for scientific purposes, by translating the film by known means in the plane of transparency 17. In other words, transparency 17 becomes a moving film instead of a stationary slide.

Other objects, such as the clock mentioned in connection with Fig. 2 are equally applicable to the embodiments of Fig. 5 and this is shown in Fig. 6. In Fig. 6 a new enclosing cylinder 88, identified as 103, has been provided which includes a reflective semi-torus area 104 and a light absorbing area 105. By means of the commercially available ring-shaped fluorescent lamp 106, or equivalent, the opaque surface 107 is evenly illuminated, including the hands of a clock 108, 109, or other objects, either stationary or movable. Carrier 110 is adjustable in position in a manner similar to previous carrier 24 and there is space behind the exhibited surface for the clock mechanism or other actuator 111. Lenses 21 and 2 form an image of surface 107 upon plane 5 as before. The details of enclosing cylinders 88 and 103 and carriers 24 and 110 may be altered to allow each to perform duplicate functions, to be interchangeable or to be otherwise convenient in practice as will be realized from the teaching of this specification.

It will be further understood that lens 50 of Fig. 5 may be omitted therefrom and may be added to the embodiment of Fig. 2 in an analagous position. Also, by rotating knob 102 in Fig. 5 that device may be manually operated. By disengaging pins 86 or 97 from plate 64 in Fig. 5 manual operation of the superimposition elements is possible. Furthermore, the manual type construction of the superimposition portion of my invention shown in Fig. 2 may be employed in Fig. 5 in lieu of the automatic type construction shown.

Specific motion can be given to any slide, either manually or by means of a cam coacting spring, to simulate motion between the principal object 4 and surroundings from the superimposition picture. By employing a still-picture scene of the horizon taken from an airplane and actors sitting in an otherwise stationary portion of an airplane upon a stage, motion of the slide as indicated give the impression of flight when the scenes are superimposed with my device.

The embodiment of Fig. 5 may be characterized as an adjustable focal length lens with coacting superimposition device when the mechanism is stationary and as a zoom lens with zoom superimposition device when the mechanism is operating. My device finds much use in each of these aspects in television, motion pictures and allied arts.

Numerous modifications may be made in the size, proportion, shape and arrangement of the parts without departing from the spirit of my invention as defined by the following claims.

I claim:

1. In an optical system, aligned in order, a divergent primary lens, an angularly disposed transmissive-reflective element, a convergent secondary lens, and an image plane; said lenses positioned to form an image of an object within the field of said lenses upon said image plane and so constituted and spaced that the magnification of said image is approximately proportional to the inverse of the distance between said primary and said secondary lenses over a working range; another object outside the field of said lenses, an additional weakly convergent lens positioned to collect light from said other object and direct it unto said transmissive-reflective element such that said light is reflected by said element with approximately the same divergence into said secondary lens as the light from said divergent primary lens, said elements spaced to form a focused image of said other object upon said image plane; and means to alter the positions of at least one of the pair of elements, said other object and said additional lens, as a function of the inverse of the distance between said primary and said secondary lenses so that the magnification of the image of said other object is proportional to the magnification of the image of said first-mentioned object.

2. In an optical system, a divergent primary lens and a coaxially-positioned convergent secondary lens spaced therefrom, an image plane, means to simultaneously move said lenses with respect to said plane to focus an image thereon, means to move said lenses coaxially with respect to each other to change the magnification of said image, an object, means to illuminate said object, a weakly convergent lens for collecting illumination from said object, transmissive-reflective means angularly located in the optical path between said primary and secondary lenses and transmissive to said path for reflecting illumination collected by said weakly convergent lens into said secondary lens, the focal length of said divergent primary lens and its position relative to said convergent secondary lens corresponding to the focal length of said weakly convergent lens and its position relative to said convergent secondary lens such that the curvatures of the optical wavefronts from the two systems are substantially the same at the light impingement side of said convergent secondary lens and coupled means for moving at least one of the group of elements comprised of said object, said weakly convergent lens and said transmissive-reflective means to focus an image of said object upon said image plane and to change the magnification of that image.

3. In an optical system, a negative primary lens and a coaxially related positive secondary lens spaced therefrom, means to move said lenses coaxially with respect to one another, an object, means to illuminate said object, a weakly convergent lens system, a semitransparent mirror, said mirror located in the optical path between said primary and secondary lenses oblique to the axis thereof, said object and said weakly convergent lens system located adjacent to and with respect to said mirror such that illumination from said object passing through said weakly convergent lens system is reflected by said mirror to said secondary lens and axially aligned therewith, said weakly convergent lens system positioned to cause an image of said object to be formed on the same plane as an image that is formed by said primary and secondary lenses by virtue of the curvatures of the light wavefronts from both being approximately the same upon entering said secondary lens.

4. In an optical system, coaxially related spaced primary divergent and secondary convergent lenses, cam operated means to move said lenses coaxially, optical means for producing a real image, mechanical means for moving the plane of said image, partially reflective means interposed between said primary and said secondary lenses at an angle to the coaxis to reflect the light of said real image through said secondary lens, a link, gear and worm shaft means connecting the means for moving said primary and secondary lenses to the means for moving the plane of said real image constituted to maintain superimposed images formed by said primary and secondary lenses and of said real image by said secondary lens in focus and of equivalent magnification on a common plane the optical elements so constructed and positioned that the divergence of the light from said primary divergent lens and from said real image being substantially equal upon entering said secondary convergent lens.

5. In an optical system, in order, a convergent primary lens, a divergent primary lens, a transmissive-reflective element, a convergent secondary lens and an image plane; means to move said lenses axially with respect to said plane to focus an image thereon, a follower attached to said divergent primary lens and a cam engaging said follower attached to said secondary lens, said cam shaped to change the magnification of the image on said plane with motion of said divergent primary lens relative to said secondary lens; a source of illumination, a transparency, a linkage connecting said transparency to said cam, means to adjust said linkage for altering the motion of said transparency relative to that of said cam, a convergent lens positioned to collect the illumination from said source that has passed through said transparency, a linkage connecting said convergent lens to said cam, means to adjust said linkage for altering the motion of said convergent lens relative to that of said cam; said transmissive-reflective element positioned to reflect the illumination collected by said converging lens to said secondary lens, said transparency and said convergent lens positioned to focus an image of said transparency in coaction with said secondary lens upon said image plane and said linkages adapted to change the magnification of the image of said transparency in synchronism with the change in magnification caused by the motion of said divergent primary lens relative to said secondary lens.

6. In an optical system, spaced divergent and convergent lenses for forming an image of an object upon an image surface, means to coaxially adjust the position of at least one of said lenses to change the magnification of said image, a motion picture film, means to illuminate said film, means to move said film to give moving pictures, means to form an image thereof, plural optical means including a right-angle prism in the path of the illumination that forms said image to alter the direction of said path and to rotate said image through a right angle, a translucent screen positioned to receive the image formed by said image-forming means, means interposed between said divergent and convergent lenses for directing the illumination from the image on said screen through said convergent lens, said latter means and said screen so positioned as to cause an image of the picture on said motion picture film to be formed on the same surface as that upon which the image of said object is formed by virtue of the degree of divergence of the illumination from said object and from said motion picture film being substantially the same upon entering said convergent lens.

7. In an optical system, spaced divergent and convergent lenses for forming an image of an object on a surface, means to coaxially adjust at least the position of both of said lenses to change the magnification of said image, a motion picture film, means to illuminate said film, means to move said film vertically to give motion pictures, means to project an image from said motion picture film, a translucent screen positioned to receive said latter image, a right-angle prism and a mirror inclined at an acute angle to the vertical in the optical path between said means to form an image and said translucent screen to rotate said motion picture image through a right angle, a half-silvered mirror positioned between said divergent and convergent lenses for directing the illumination from the image on said screen through said convergent lens, said latter directing means and said screen positioned to cause an image of the picture on the motion picture film to be formed on the same surface as that of the image of said object by virtue of the degree of curvature of the wavefronts of the light from said object and from said motion picture film being substantially the same upon entering said convergent lens.

8. In an optical system in accordance with claim 1, means to illuminate said outside object comprising a ring-shaped source of radiant energy housed in a torus-like reflector.

9. In an optical system in accordance with claim 2, additional means for moving said real image transverse to said prior motion to cause the image thereof upon said surface to move with respect to said first image focused upon said surface.

References Cited in the file of this patent

UNITED STATES PATENTS

| | | |
|---|---|---|
| 1,411,689 | Frederick et al. | Apr. 4, 1922 |
| 1,790,232 | Flora | Jan. 27, 1931 |
| 1,898,471 | Walker | Feb. 21, 1933 |
| 1,899,032 | Handschiegl | Feb. 28, 1933 |
| 1,959,498 | Planskoy | May 22, 1934 |
| 2,307,202 | Eddy | Jan. 5, 1943 |
| 2,334,962 | Seitz | Nov. 23, 1943 |
| 2,406,451 | Borkenstein | Aug. 27, 1946 |
| 2,442,564 | Heyer | June 1, 1948 |
| 2,489,789 | Korkosz | Nov. 29, 1949 |
| 2,515,104 | Walker | July 11, 1950 |